(12) United States Patent
Smith et al.

(10) Patent No.: US 9,352,819 B2
(45) Date of Patent: May 31, 2016

(54) AIRSHIP PITCH TRIM AND DIRECTIONAL CONTROL SYSTEM

(71) Applicant: Raven Industries, Inc., Sioux Falls, SD (US)

(72) Inventors: Michael Scott Smith, Sulphur Springs, TX (US); Randy E. Scott, Sulphur Springs, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 261 days.

(21) Appl. No.: 14/209,926

(22) Filed: Mar. 13, 2014

(65) Prior Publication Data

US 2014/0263827 A1    Sep. 18, 2014

Related U.S. Application Data

(60) Provisional application No. 61/782,972, filed on Mar. 14, 2013.

(51) Int. Cl.
*B64B 1/02*   (2006.01)
*B64B 1/38*   (2006.01)
*B64B 1/22*   (2006.01)

(52) U.S. Cl.
CPC .... *B64B 1/38* (2013.01); *B64B 1/22* (2013.01)

(58) Field of Classification Search
CPC ............ B60C 29/00; B64B 1/22; B64B 1/38; B64B 1/70
See application file for complete search history.

(56) References Cited

U.S. PATENT DOCUMENTS

| | | | | |
|---|---|---|---|---|
| 3,971,533 A * | 7/1976 | Slater | | B64B 1/38 244/30 |
| 4,066,113 A * | 1/1978 | Oldshue | | B60C 29/00 152/367 |
| 4,238,095 A * | 12/1980 | Slater | | H01F 7/04 244/115 |
| 4,272,042 A * | 6/1981 | Slater | | B64B 1/38 244/115 |
| 5,141,463 A * | 8/1992 | Rouse, Jr. | | A63H 27/10 137/223 |
| 5,429,539 A * | 7/1995 | Glasa | | B60C 29/00 222/5 |
| 6,305,641 B1 * | 10/2001 | Onda | | B64B 1/26 244/30 |
| 6,609,680 B2 * | 8/2003 | Perry | | B64B 1/02 244/127 |
| 7,185,848 B2 * | 3/2007 | Heaven, Jr. | | B64B 1/70 244/93 |
| 7,341,223 B2 * | 3/2008 | Chu | | B64B 1/14 244/24 |
| 2008/0011900 A1 * | 1/2008 | Quintana | | B64B 1/30 244/30 |
| 2009/0065637 A1 * | 3/2009 | Duncan | | B64B 1/58 244/97 |
| 2012/0181381 A1 * | 7/2012 | VercesI | | B64B 1/04 244/96 |
| 2013/0062457 A1 * | 3/2013 | Deakin | | B64B 1/08 244/25 |

* cited by examiner

*Primary Examiner* — Brian M O'Hara
*Assistant Examiner* — Michael Kreiner
(74) *Attorney, Agent, or Firm* — Schwegman Lundberg & Woessner, P.A.

(57) ABSTRACT

An example can include a pod detachably coupled to a hull. At least one thrust generator can be fixed to the pod. A power source can be mounted to the pod and slideable fore and aft. A power source actuator can be coupled between the pod and the power source to translate the location of the power source with respect to the pod. A sensor can be coupled to the pod to detect a pitch of the hull and provide a pitch signal. A controller can be coupled to one or more of the power source, the power source actuator, the first and second thrust generators and the sensor. The controller can maintain a pitch of the hull by translating the power source within the pod in association with the pitch signal.

19 Claims, 11 Drawing Sheets

AIRSHIP PITCH TRIM AND DIRECTIONAL CONTROL SYSTEM

CROSS-REFERENCE TO RELATED APPLICATION

This application claims the benefit of priority to U.S. Provisional Patent Application Ser. No. 61/782,972, filed Mar. 14, 2013, the disclosure of which is incorporated herein in its entirety by reference.

BACKGROUND

Aerostats include free balloons, airships, and moored balloons. An aerostat is a craft that can remain aloft through the use of buoyant lighter than air gases that impart lift to a vehicle. Aerostats use "aerostatic" lift, which is a buoyant force that does not require movement through the surrounding air mass. An aerostat's main structural component is its envelope, a lightweight skin containing a lifting gas to provide buoyancy, to which other components are attached. The vehicle has slightly less density than air and is thus kept aloft.

An aerostat can be used for numerous high-altitude activities. Payloads including instruments, communications equipment and the like can be coupled with or suspended from the aerostat. The payloads can be configured to conduct operations (e.g., observation, communication and the like) at the high altitudes, for instance an altitude of 20 miles. At such an altitude, a very large area can be surveyed, for example an area that encompasses a circle of a diameter over 600 miles. The equipment can function as a repeater, bouncing communication signals for many miles. By virtue of its high altitude, the vessel can be placed out of range of most small arms. While more sophisticated armaments can reach such a vessel, they would likely cost much more than the aerostat, perhaps 100 times as much, disincentivizing such an attack.

Aerostats contrast with aerodynes that primarily use aerodynamic lift which requires the movement of at least some part of the aircraft through the surrounding air mass. Airships, like other aircraft, generally rely on external control mechanisms (e.g., elevators, fins, rudders, etc.) to control the attitude of the airship and stabilize the airship in flight. Airships are generally subject to moments along two axes, which can be defined by two primary control vectors. The two primary control vectors are pitch (rotation about the lateral axis) and yaw (rotation about the vertical axis).

Conventional control systems rely on external control mechanisms to create aerodynamic forces causing the airship to pitch and/or yaw as desired, primarily to counteract external forces (e.g., a gust of wind or clouds) that would otherwise destabilize the airship in flight. Conventional control systems are also used to adjust the angle of attack for airships that depend on dynamic lift and reverse dynamic lift for takeoff and landing. These external control mechanisms, however, are inefficient because they add significant weight to the airship and their operation also generates drag, which slows the airship as it moves in the desired direction. These external control mechanisms generate drag even when they are not activated, because they tend to disrupt the aerodynamic shape of the airship. Additionally, these conventional control systems do not perform well in very slow or hovering flight because insufficient airflow is generated over the external control mechanisms.

Overview

The present inventors have recognized, among other things, that a problem to be solved can include an aerostat that is able to relocate itself without the aid of complex equipment.

The present subject matter can provide a solution to this problem, such as by providing a pod, including a power source actuator, to translate the location of the power source with respect to the pod to alter pitch. Further, the present subject matter can provide a solution to this problem, such as by providing twin thrusters that can generate different levels of thrust to alter yaw.

Existing airship designs require attachment of numerous control systems and mechanisms to the airship hull. This approach is acceptable for low altitude airships that can be moored and docked for maintenance. High altitude airships flying in the stratosphere will not fly traditional airship missions. At the end of a high altitude airship mission, it can be economical for the pod to be detached and return to the ground on a parachute rather than employ the complex control systems required to fly the system to the ground and dock it.

The present inventors have recognized, among other things, that a problem to be solved can include providing a compact, detachable pod that can be coupled to an aerostat to aid in controlling the heading of the aerostat. This present subject matter provides a means for controlling the airship motion from a single detachable pod. But for the pod, the hull can be free of thrust generators or movable control devices, such as rudders or elevators.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
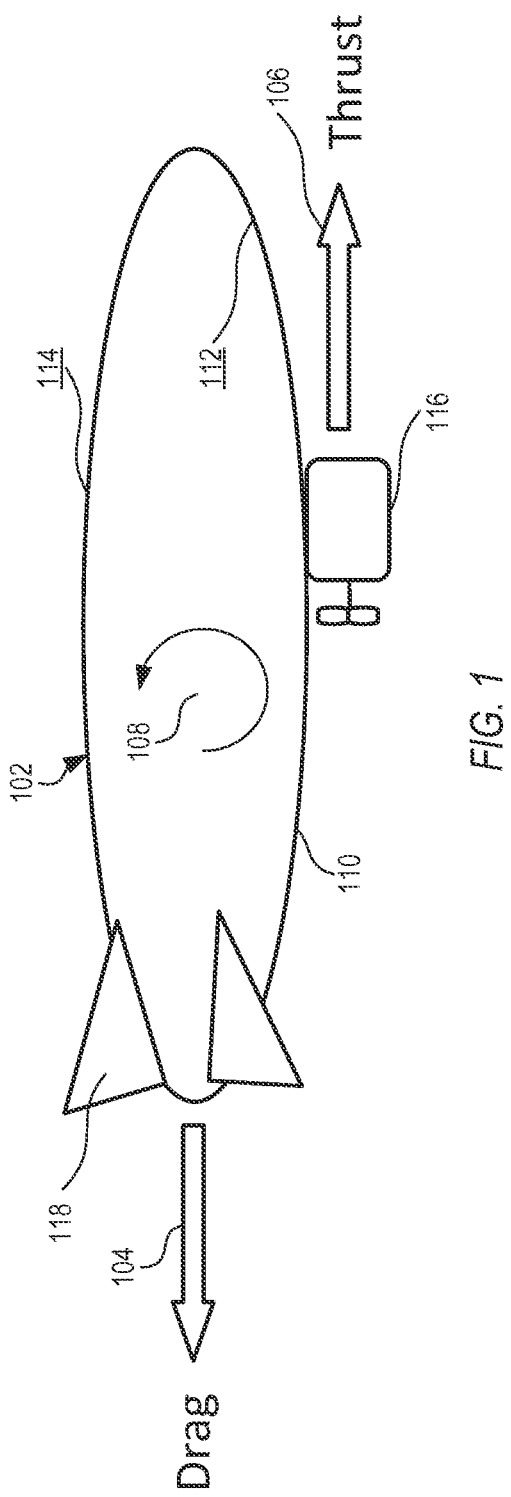
FIG. 1 shows a vessel pitching up due to thrust.

FIG. 1 shows a vessel 102 pitching up due to thrust. The vessel (e.g., an airship or aerostat) can include a hull 110 that can be buoyant. The hull 110 can have an inner surface 112 and an outer surface 114. The hull can be configured to contain a gas of a lower density than an ambient gas. A thrust generator mounted on the gondola 116 of the vessel 102 can cause the vessel 102 to pitch up when the thrust generator is generating thrust due to the off-axis location of the thrust 106 and drag 104 vectors. The drag 104 and thrust 106 vectors can result in a pitch-up or nose-up moment 108. In some instances it is desirable to avoid such a moment, which can tend to increase elevation, for instance when oncoming airflows pass over one or more fins 118. For example, it can be desirable to keep a station, or geological position and altitude, while surveillance is underway. Adjustable vector thrusters can be used, but at the expense of cost and complexity added to the hull 110.

Figure 2:
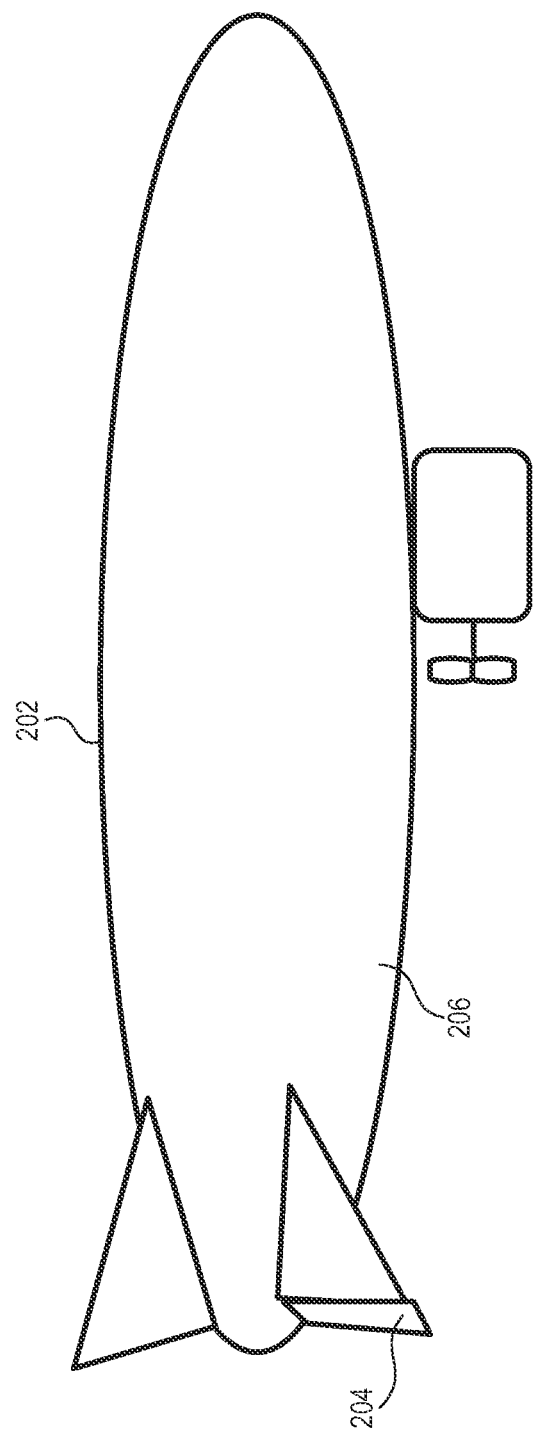
FIG. 2 shows a vessel adjusting pitch with an active control surface.

FIG. 2 shows a vessel 202 adjusting pitch with an active control surface 204. The active control surface uses rigging to transmit power to the tail or empennage to alter the shape of the control surface 204. The rigging adds cost and complexity, again to the hull 206.

Figure 3:
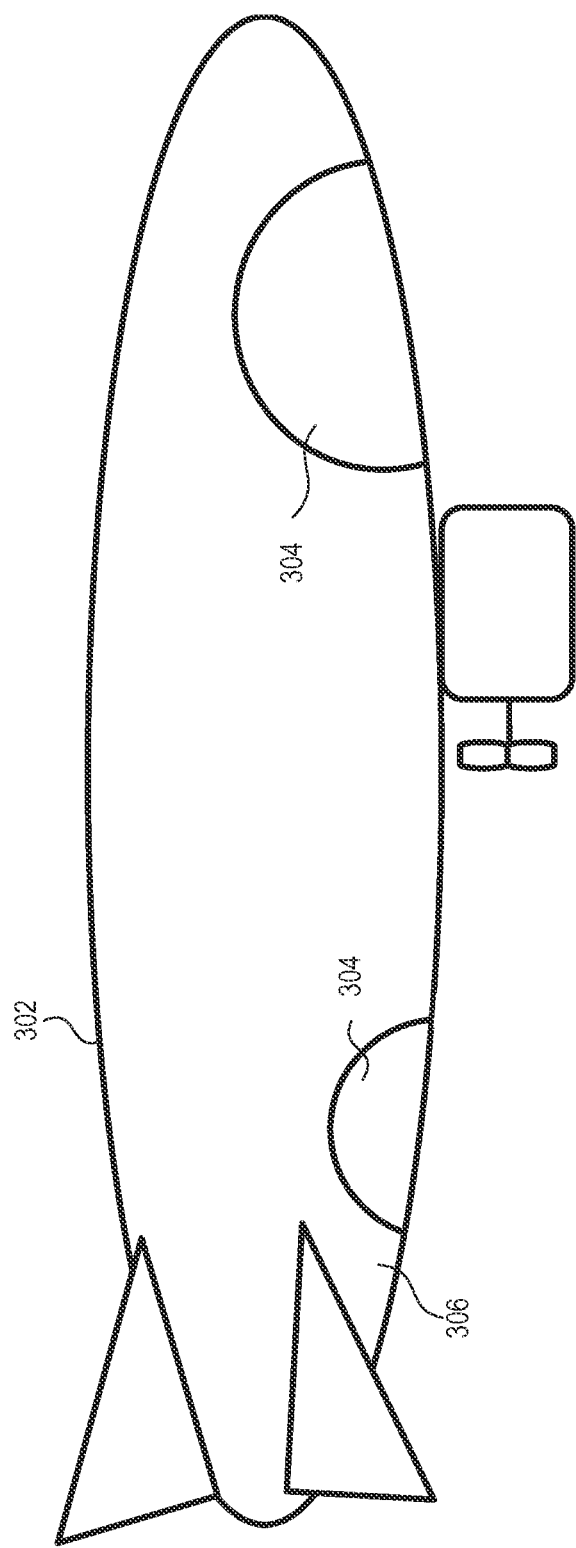
FIG. 3 shows a vessel adjusting pitch with internal bladders.

FIG. 3 shows a vessel 302 adjusting pitch with internal bladders 304. The bladders can house gas of a different density, and/or change the shape of the vessel 302. The bladder system also uses rigging to transmit fluid to the bladders to alter the shape of the bladders 304. The rigging adds cost and complexity, again to the hull 306.

Figure 4:
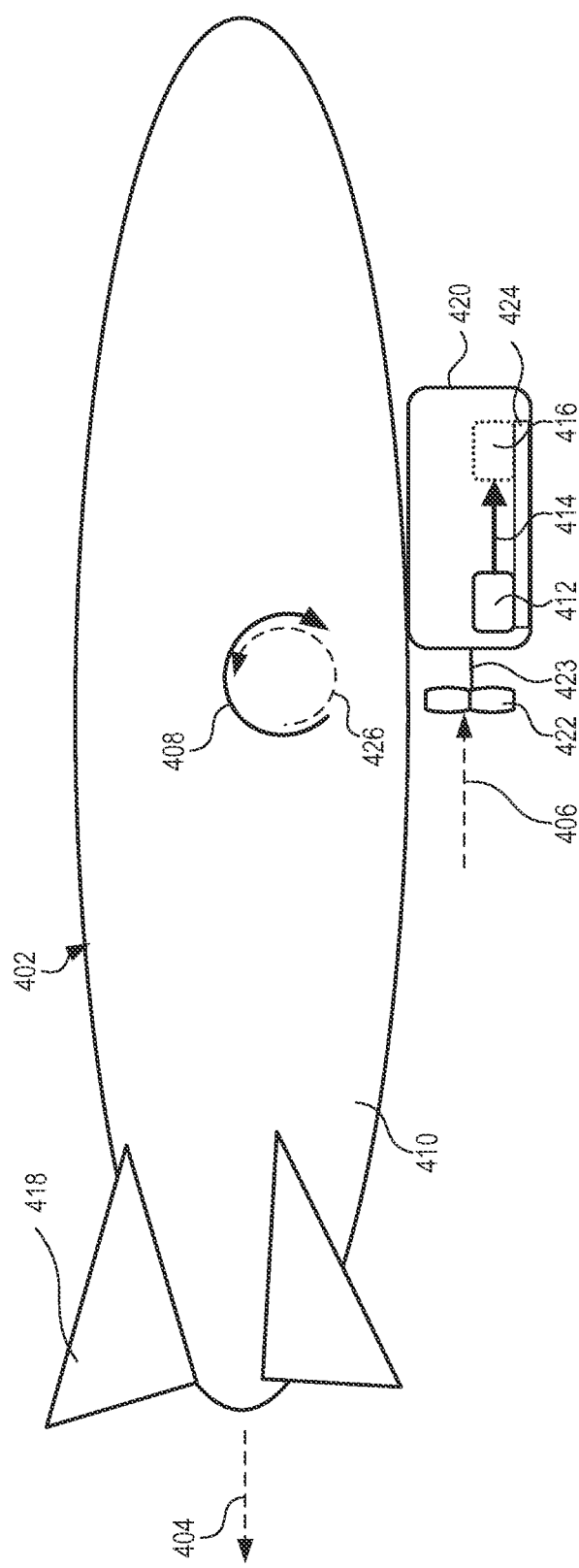
FIG. 4 shows a vessel adjusting pitch by translating the location of a mass, according to an example.

FIG. 4 shows a vessel 402 adjusting pitch by translating the location of a mass 412, according to an example. The drag 404 and thrust 406 vectors result in a pitch up moment 408. In some instances it is desirable to avoid the pitch up, which can tend to increase elevation, for example when air flows over the aerostat generating lift. This can move the aerostat out of geological position and/or altitude, termed "station." It can be desirable to keep station while surveillance is underway. Adjustable vector thrusters can be used, but at the expense of cost and complexity added to the hull 410.

To address the need for adjustable pitch without adding expensive and complex rigging to the hull 410, examples include a pod 420. The pod 420 can be detachably coupled to the hull 410. A mass 412 coupled to the pod 420, such as inside it, can be moved, such as backward or forward inside the detachable pod, to move the center of gravity of the vessel 402. The mass 412 can be moved forward to offset the upward pitch moment created by the propulsion system. Control and actuation of mass relocation can be contained within the pod 420 with little or no equipment attached to the hull 402. Thus, when drag and thrust generate the pitch moment 408, the location of the mass 412 can be translated to apply a counter-pitch moment 426 to the hull opposite the moment. The pitch moment 408 and counter-pitch moment 426 can be equal in magnitude, or can differ in magnitude to offset the pitch moment 408 a desired amount. In another example, the center of buoyancy is changed, thereby changing the orientation of one or more fixed shape tail fin 418, which can then interact with air currents to change heading. Such a fin 418 can form a passive airfoil. The entire vessel 402 can form an airfoil. The mass 412 can slide to a second position 416, or ultimate position, or be changed to occupy any number of positions therebetween. One use of the mass transfer system is enable thrust 406 to be applied, while maintain pitch, so that the vessel 402 does not gain altitude under thrust. This allows for the adjustment of the pitch trim of an airship under various power settings without the use of control surfaces on the tail.

The present subject matter can reduce or eliminate the need for control surfaces on the tail for the purpose of directional control. The present subject matter can reduce or eliminate the need for internal air bladders inside the airship hull for pitch angle adjustment.

The present subject matter can house all components of the control and propulsion system of the airship within a single pod 420 attached to the airship hull. The pod can be constructed of a lightweight airframe comprising a lattice of beams, for example, a monocoque, and the like. The pod can include a parachute sized to suspend the pod during descent.

The mass 412 can be a power source mounted to the pod 420. A power source can include, but is not limited to, a battery, a fuel cell, one or more a solar cells, a generator, and one or both of an electric motor and an internal combustion engine. A battery can be from 50-400 lbs. The mass 412 can comprise from around 25-50% of the total weight of the vessel 402.

The power source can be coupled to the thrust generator and the second thrust generator to power one or more thrust generators. A power source actuator 424 can be coupled between the pod and the power source to translate the location of the power source with respect to the pod. Examples of power source actuators include, but are not limited to, worm drives, chain drives and the like.

A thrust generator 422 can be coupled to the pod 420. The thrust generator 422 can be controlled to apply a pitch moment 408 to the hull 410. The thrust generator 422 can be adjustable, such as in orientation with respect to the pod 420. In examples in which the thrust generator includes a propeller, the propeller can be adjusted in pitch, such as to improve efficiency.

A rotor can be used to generate a moment to change pitch, yaw and/or roll. Such a rotor can function similarly to a helicopter rotor. Such a rotor or rotor system can combine of a rotary wing and a control system to generate both the thrust to move the vessel 402 and thrust to counteracts aerodynamic drag in flight. A rotor can be made up of two or more rotor blades. The blade pitch can be controlled by a swashplate connected to the helicopter flight controls, such as to alter pitch during rotation, even during a single rotation. However, in certain examples, a thrust generator is fixed in orientation and pitch, to reduce complexity and cost. A propeller or rotor can be mounted on a horizontal mast 423 at the back of the pod 420.

The present subject matter allows for the construction of disposable airship hulls for high altitude missions with all power, control, and telemetry equipment located inside a single pod that can be separated from the hull. The hull can be constructed of different types of film for differing purposes. Polyethylene film can be used for the least expensive, shortest duration flight profile. A co-extrusion of polyethylene and other materials such as nylon, EVOH, polyester, saran, and the like, can provide greater gas retention and or greater film strength/lower stretch properties. A top layer metallization and/or white pigmentation can minimize solar heating from sunlight. A bottom layer can incorporate a material to enhance the absorption of heat radiated by the earth during night times. Film properties can reduce the potential of static electricity build-up on the surface of the film during launch activities where hydrogen may be used as a lifting gas. The film can be biodegradable when exposed to moisture, sunlight, micro-organisms in water or soil after the hull returns to the earth surface. The hull may use some or none of these in varying combinations.

Figure 5:
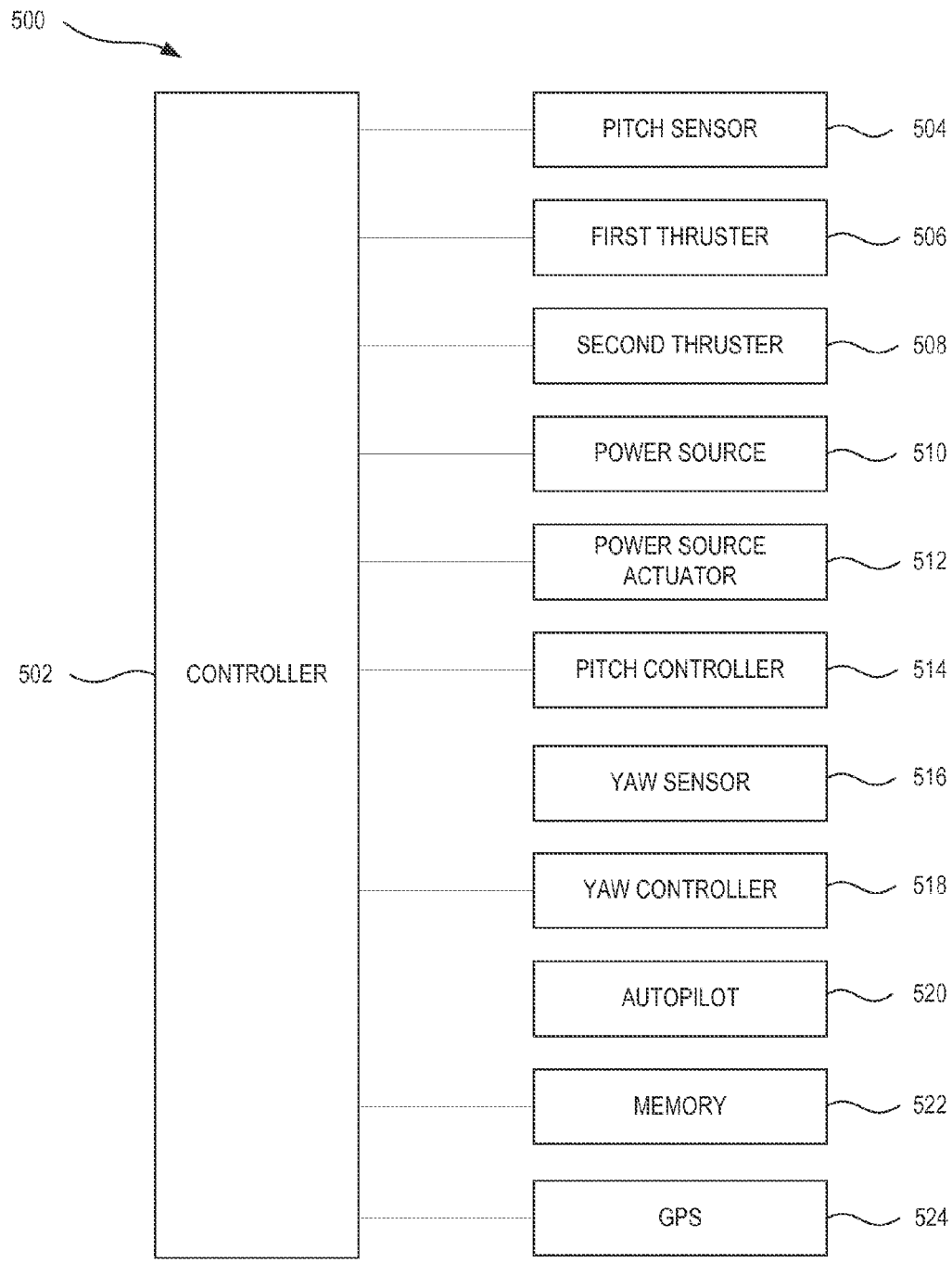
FIG. 5 shows a block diagram of a control system, according to an example.

FIG. 5 shows a block diagram of a control system 500, according to an example. Each of the blocks can be used separately, or in combination with other blocks shown. A controller 502 can be coupled to one or more of the pitch sensor 504, a first thruster 506, a second thruster 508, a power source 510, a power source actuator 512, a pitch controller 514, a yaw sensor 516, a yaw controller 518, an autopilot system 520, a memory 522 and a GPS 524. The controller can transmit power and/or information with each of the components. For example, the controller can control power delivered to each of the first thruster 506, a second thruster 508, derived from the powersource 510.

A pitch sensor 504 can be coupled to the pod to detect a pitch of the hull and provide a pitch signal. A pitch controller 514 can receive a pitch signal, determine a desired pitch, and provide a desired pitch signal to the controller 502. The pitch controller 514 can be integrated with the controller 502. The pitch sensor 504, pitch controller 514 and controller 502 thus provide a pitch-control feedback system. The controller can maintain a pitch of the hull by translating the power source within the pod in association with the pitch signal.

A yaw sensor 516 can be coupled to the pod to detect a yaw of the hull and provide a yaw signal. A yaw controller 518 can receive a yaw signal, determine a desired yaw, and provide a desired yaw signal to the controller 502. The yaw controller 518 can be integrated with the controller 502. The yaw sensor 516, yaw controller 518 and controller 502 thus provide a yaw-control feedback system. The controller can maintain a yaw of the hull by translating the power source within the pod in association with the yaw signal.

The controller can control the power source actuator 512 to control the location of the power source 510 can be translated to apply a counter-pitch moment to the hull opposite the moment. For example, the controller can control power delivered to the power source actuator 512. To gain altitude, the power source actuator can be controlled to pitch the vessel up so that one or more thrust generators can propel the vessel upward.

Pitch and yaw can be informed by information from one or more of the autopilot 520, memory 522 and GPS 524. For example, one or more waypoints can be stored in the memory 522, and the control 502 can access such information to determine whether a vessel is on course. If the vessel is not on course, the controller 502 can interact with other systems to correct the heading. The GPS 524 can aid in determine whether the vessel is on course, and the autopilot 520 can be used to hold a course as the vessel travels. One or more of the sensors can be integrated into an accelerometer coupled to the controller 502. Together, the control system 500 provides station-keeping electronics to maintain a pitch of the hull in association with a station location signal.

Figure 6:
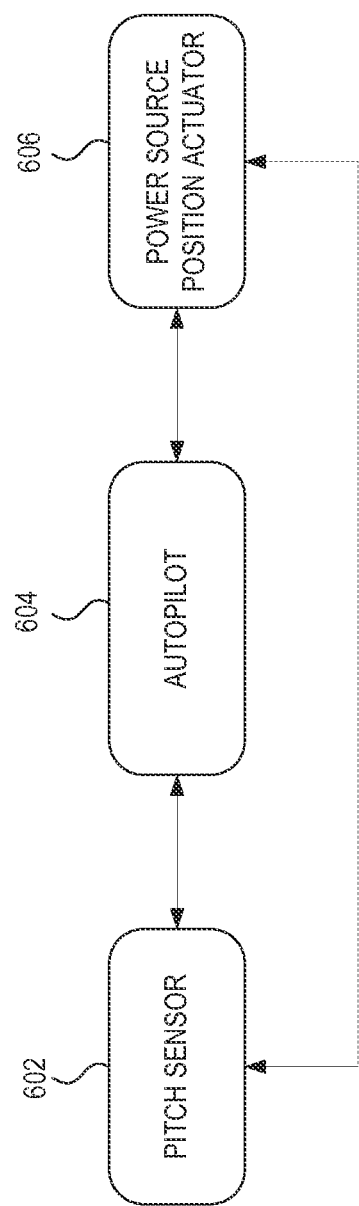
FIG. 6 shows a method of pitch adjusting, according to an example.

FIG. 6 shows a method of pitch adjusting, according to an example. The pitch of the system can be maintained level by a control system. A pitch sensor 602, located in the pod, can provide input to an autopilot 604, which calculates the desired power source position based on the current thrust, air speed, pitch, and pitch rate, and controls a power source position actuator 606 to locate the power source to that position. The autopilot 604 can adjust a rotational speed of at least one of the thrust generators while translating the location of the power source with respect to the pod to keep a station of the aerostat.

Figure 7:
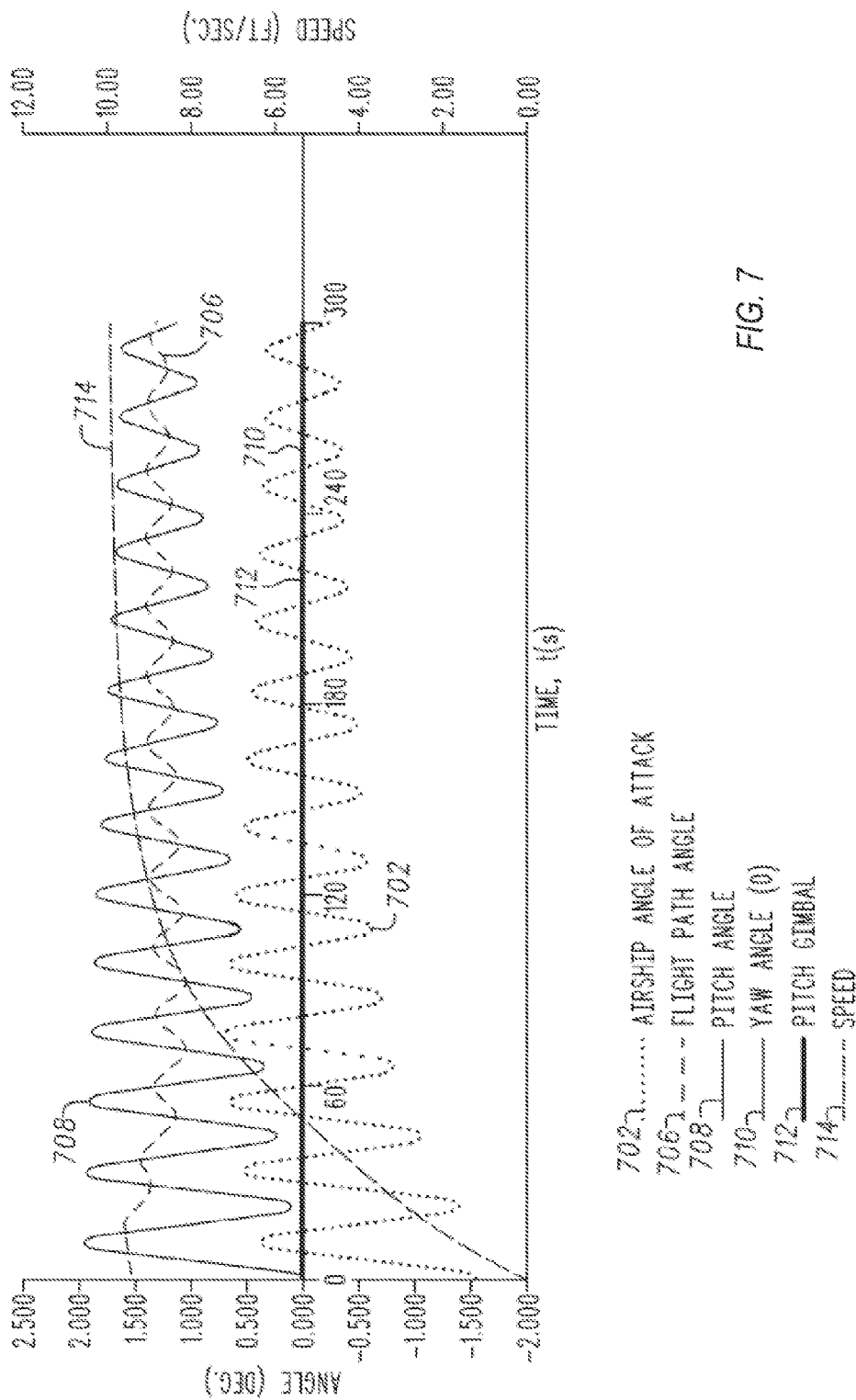
FIG. 7 shows information relating to pitch adjustment without mass transfer.

FIG. 7 shows information relating to pitch adjustment without mass transfer. The example shows a standing start with 2 pounds of thrust without pitch control. The off-center line represents thrust from the thrust generator. The chart shows airship angle of attack 702, flight path angle 706, pitch angle 708, yaw angle 710, pitch gimbal 712 and speed 714.

Figure 8:
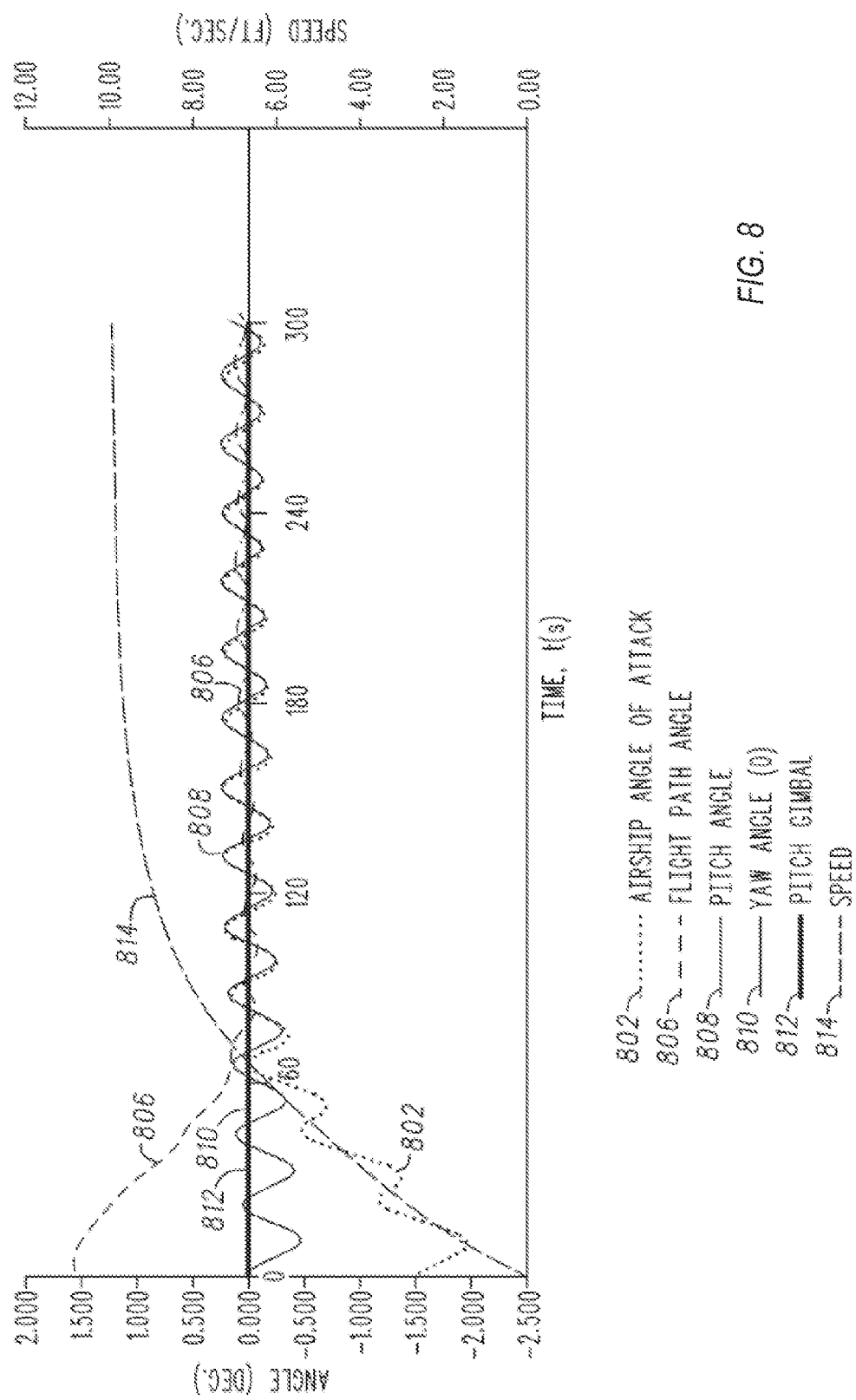
FIG. 8 shows information relating to pitch adjustment with mass transfer.

FIG. 8 shows information relating to pitch adjustment with mass transfer. The example shows a standing start with 2 pounds of thrust applied with pitch control. The climb angle is reduced to zero within one minute, demonstrating superior performance to an example without pitch control. The chart shows airship angle of attack 802, flight path angle 806, pitch angle 808, yaw angle 810, pitch gimbal 812 and speed 814.

Figure 9:
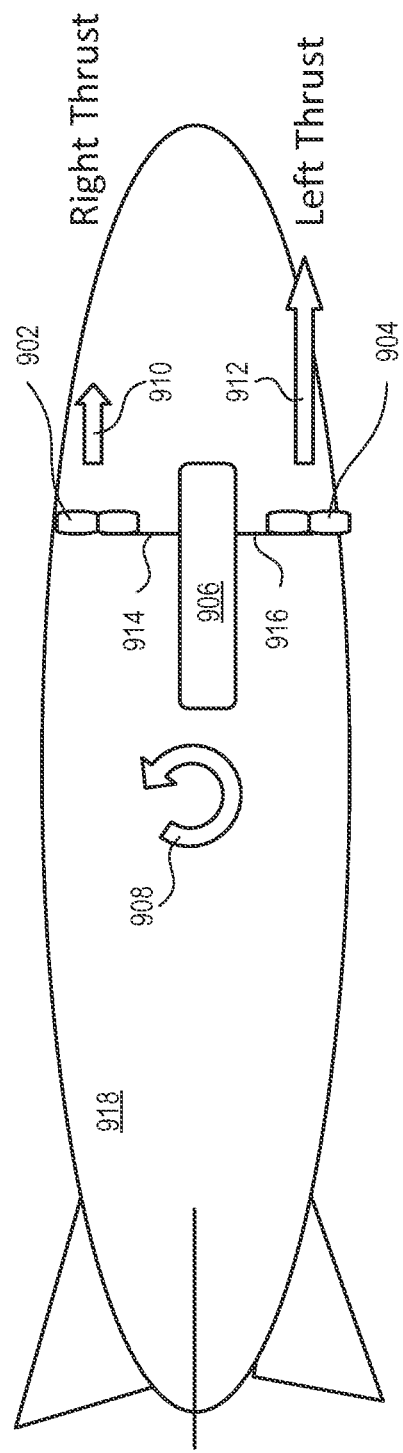
FIG. 9 shows a system for yaw adjustment, according to an example.

FIG. 9 shows a system for yaw adjustment, according to an example. Directional control can rely on movable control surfaces on the tail or vectored propellers attached to the hull. This can add cost and complexity, and can render a. hull too valuable to dispose of after one use. Accordingly, the present subject matter provides thrust generators 902, 904. The illustration shows a bottom view of an airship or aerostat with a detachable pod with thrust generators mounted on the ends of booms 914, 916. By applying different amounts 910, 912 of thrust to the two motors, a turning moment 908 can be applied to the airship without the need for control systems or mechanisms attached to the airship hull 918. Each thrust generator can be fixed to the pod and located a fixed distance from a center of the hull. The fixed thrust generators can be substantially aligned with one another and/or parallel.

The power source can be coupled to each of the first thrust generator and the second thrust generator to power each of the first thrust generator and the second thrust generator.

Figure 10:
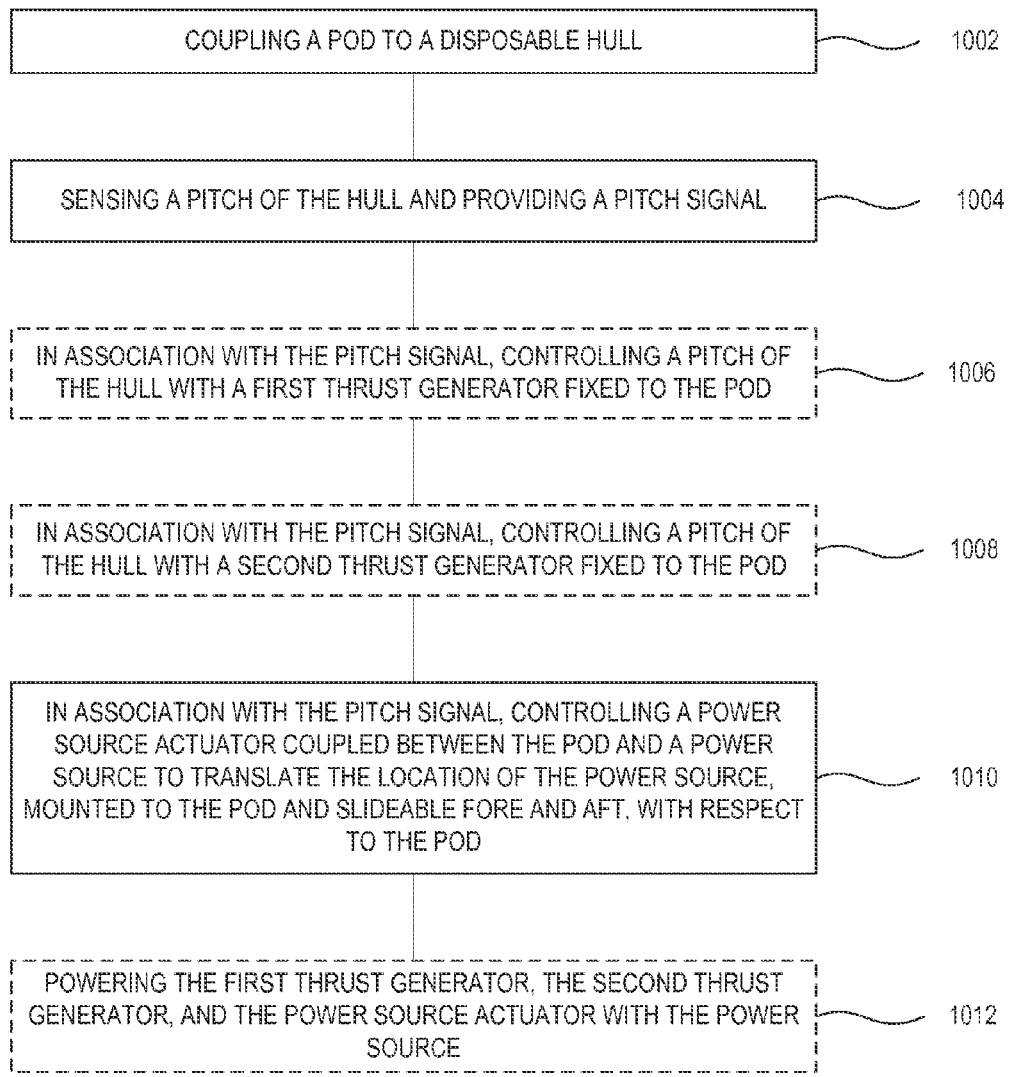
FIG. 10 is a method of operating an aerostat, according to an example.

FIG. 10 is a method of operating an aerostat, according to an example. At 1002, the method can include coupling a pod to a disposable hull. At 1004, the method can include sensing a pitch of the hull and providing a pitch signal. At 1006, in association with the pitch signal, the method can include controlling a pitch of the hull with a first thrust generator fixed to the pod. In an optional method, the thrust generator can be located a fixed distance left of a center of the hull and aligned to pitch the hull up. At 1008, in association with the pitch signal, the method can include controlling a pitch of the hull with a second thrust generator fixed to the pod. In an optional method, the thrust generator can be located the fixed distance right of the center of the hull and aligned to pitch the hull up. A thrust of the first thrust generator can be substantially parallel with a thrust of the second thrust generator. At 1010, in association with the pitch signal, the method can include controlling a power source actuator coupled between the pod and the power source to translate the location of a power source. The actuator can be mounted to the pod and slideable, such as fore and aft. At 1012, the method can include powering one or more of the first thrust generator, the second thrust generator, and the power source actuator with the power source, among any other pod electronics.

An optional method can include partially filling the hull with a gas of a lower density than an ambient. The hull can fill with increasing altitude to assume a desired shape.

The present system and method address a problem in that an aerostat integrating many components can requires full inflation at launch. For example, a rigid empennage requires the aerostat to be filly inflated. The present systems and methods allow for a launch while partially inflated. Gas, such as helium, can expand up to 15 times in volume for a given mass. Thus, the present systems and methods provide for the use of helium and like gasses while operating at high altitudes. Examples of the present subject matter can be from around 100-200 foot in length, and greater. Examples can be scaled depending upon desired payload and altitude.

Figure 11:
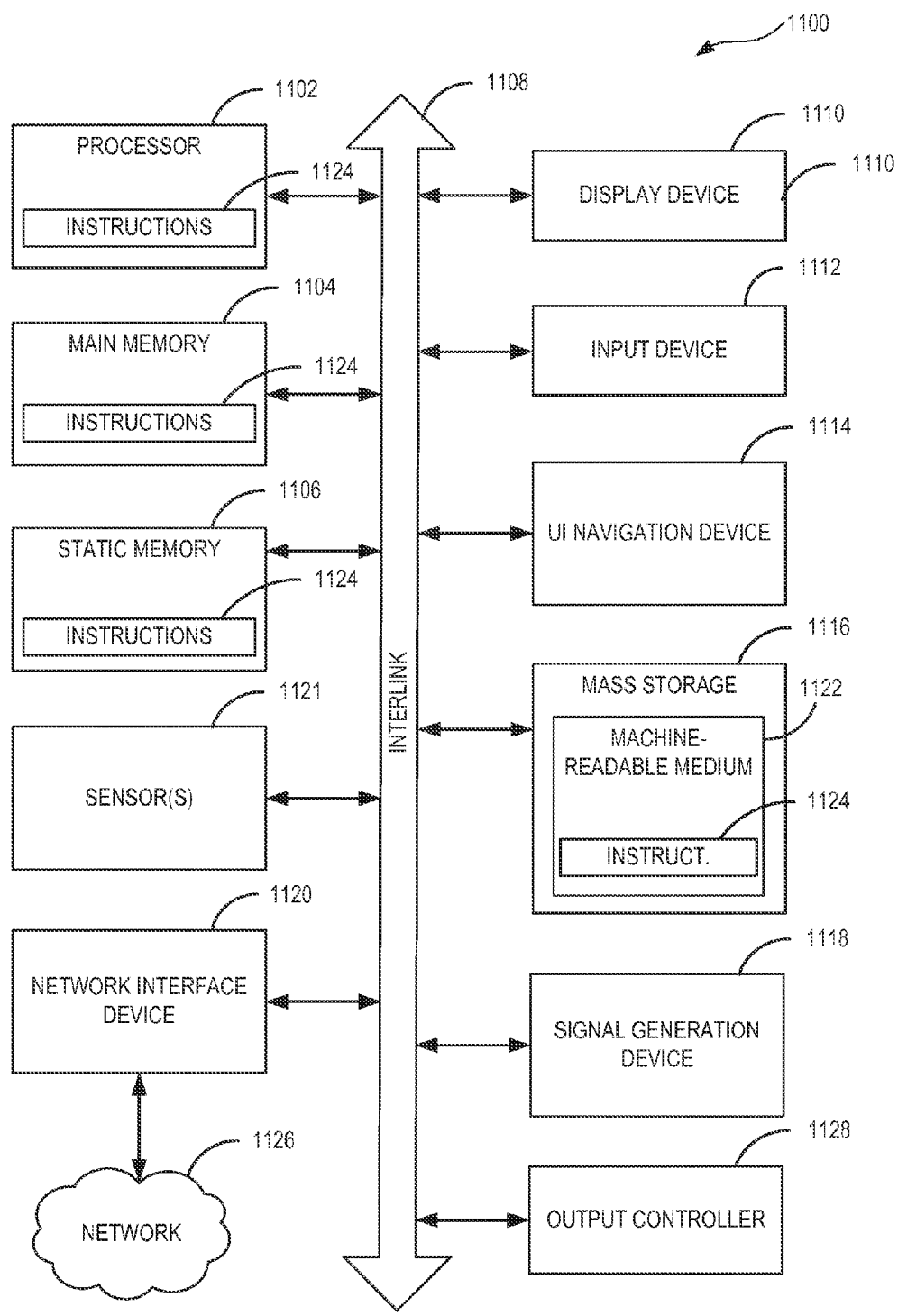
FIG. 11 is a block diagram illustrating an example of a machine upon which one or more embodiments may be implemented.

FIG. 11 is a block diagram illustrating an example of a machine upon which one or more embodiments may be implemented. FIG. 11 illustrates a block diagram of an example circuit 1100 which can be used in conjunction with any of the examples discussed herein. The circuit 1100 can operate as a standalone device or can be connected (e.g., networked) to other circuits. The circuit 1100 can form all or a part of a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. The term "circuit" can include any collection of circuits that individually or jointly execute a set (or multiple sets) of instructions to perform any one or more of the systemologies discussed herein, such as cloud computing, software as a service (SaaS), other computer cluster configurations. Insofar as circuit examples include software, such software can reside on a machine readable medium. Software, when executed by hardware, can cause the hardware to perform a function.

Circuit (e.g., computer system) 1100 can include a hardware processor 1102 (e.g., a central processing unit (CPU), a graphics processing unit (GPU), a hardware processor core, or any combination thereof), a main memory 1104 and a static memory 1106, some or all of which can communicate with each other via an interlink (e.g., bus) 1108. The circuit 1100 can further include a display unit 1110, an alphanumeric input device 1112 (e.g., a keyboard), and a user interface (UI) navigation device 1114 (e.g., a mouse). The display unit 1110, input device 1112 and UI navigation device 1114 can be a touch screen display. The circuit 1100 can additionally include a storage device 1116 (e.g., drive unit), a signal generation device 1118 (e.g., a speaker), a network interface device 1120, and one or more sensors 1121, such as a global positioning system (GPS) sensor, compass, accelerometer, or other sensor. The circuit 1100 can include an output controller 1128, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

The storage device 1116 can include a machine readable medium 1122 on which is stored one or more sets of data structures or instructions 1124 (e.g., software) embodying or utilized by any one or more of the techniques or functions described herein. The instructions 1124 can also reside, completely or at least partially, within the main memory 1104, within static memory 1106, or within the hardware processor 1102 during execution thereof by the circuit 1100. In an example, one or any combination of the hardware processor 1102, the main memory 1104, the static memory 1106, or the storage device 1116 can constitute machine readable media.

While the machine readable medium 1122 is illustrated as a single medium, the term "machine readable medium" can include a single medium or multiple media (e.g., a centralized or distributed database, and/or associated caches and servers) that configured to store the one or more instructions 1124.

The term "machine readable medium" can include any medium that is capable of storing, encoding, or carrying instructions for execution by the circuit 1100 and that cause the circuit 1100 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having resting mass. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 can further be transmitted or received over a communications network 1126 using a transmission medium via the network interface device 1120 utilizing any one of a number of transfer protocols (e.g., frame internet protocol (IP), transmission control protocol (TCP), user datagram. protocol (UDP), hypertext transfer protocol (HTTP), etc.). Example communication networks can include a local area network (TAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®, IEEE 802.16 family of standards known as WiMax®), peer-to-peer (P2P) networks, among others. The network interface device 1120 can include one or more physical jacks (e.g., Ethernet, coaxial, or phone jacks) or one or more antennas to connect to the communications network 1126. The network interface device 1120 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the circuit 1100, and includes digital or analog communications signals or other intangible medium to facilitate communication of such software.

A system example for controlling aerostat navigation can include a sensor configured to produce a plurality of signals over time, such as at 1121. The example can include a storage circuit, such as at 1106, to store navigation information. Such as circuit can comprise a stand-alone circuit, such as a circuit board or an ASIC that communicate over the bus 1108. The circuit can comprise instructions 1124 on the processor 1102. Such as circuit can comprise a stand-alone circuit, such as a circuit board or an ASIC that communicate over the bus 1108. The circuit can comprise instructions 1124 on the processor 1102. The example can include an output transmitter, such as the output controller 1128. The output transmitter can be a wireless transmitter. A wireless transmitter can comprise a Bluetooth transmitter configured to communicate using the Bluetooth standard. A display can be coupled to the output transmitter to display visual indicia. Such a display can include a video screen, an electronically controlled compass that can be embodied in video, and the like.

Various examples can communication using a protocol adapted to be compatible with the Bluetooth™ wireless communication system. The Bluetooth™ wireless communication system can operate on an unlicensed 2.4 GHz. Industrial, Scientific and Medical (ISM) band. Devices adapted for compatibility with the communication system can be capable of providing real-time audio-video and data communication. Copyrights to the Bluetooth™ wireless communication system specification are owned by the Promoter Members of Bluetooth SIG, Inc. The scope of the present subject matter includes wireless communications adapted to be compatible with the Bluetooth™ Specification, specifically, at least v1.2, available at http:www.bluetooth.com (last visited Jan. 26, 2004).

The storage circuit can comprise a machine readable medium including instructions 1124 that, when executed by a component of a machine, cause the machine to perform operations to store the information associated aerostat navigation, e.g. station-keeping. A storage circuit such as one or both of the memories 1104 and 1106 can include a buffer configured to store values.

Additional Notes & Examples

Example 1 includes a hull that can be buoyant. The hull can have an inner surface and an outer surface. The hull can be configured to contain a gas of a lower density than an ambient gas. A pod can be detachably coupled to the hull. A first thrust generator can be fixed to the pod and located a fixed distance left of a center of the hull and aligned to pitch the hull up. A second thrust generator fixed to the pod and located the fixed distance right of the center of the hull and aligned to pitch the hull up. A thrust of the first thrust generator can be substantially aligned with and/or parallel with a thrust of the second thrust generator. A power source can be mounted to the pod and slideable fore and aft. The power source can be coupled to each of the first thrust generator and the second thrust generator to power each of the first thrust generator and the second thrust generator. A power source actuator can be coupled between the pod and the power source to translate the location of the power source with respect to the pod. A sensor can be coupled to the pod to detect a pitch of the hull and provide a pitch signal. A controller can be coupled to one or more of the power source, the power source actuator, the first and second thrust generators and the sensor. The controller can maintain a pitch of the hull by translating the power source within the pod in association with the pitch signal.

Example 2 can include any of the subject matter of example it, wherein the controller can control at least one of the fixed thrust generator and the second thrust generator to apply a pitch moment to the hull. The location of the power source can be translated to apply a counter-pitch moment to the hull opposite the moment.

Example 3 can include any of the subject matter of any of the previous examples, wherein the controller can be a feedback controller to control the power source actuator to alter the location of the power source in association with the pitch signal.

Example 4 can include any of the subject matter of any of the previous examples, wherein the hull forms a part of an aerostat.

Example 5 can include any of the subject matter of any of the previous examples, wherein the hull can be formed of a film fixed in shape when inflated.

Example 6 can include any of the subject matter of any of the previous examples, wherein the hull forms a passive airfoil.

Example 7 can include any of the subject matter of any of the previous examples, wherein the hull includes tail fins fixed in place.

Example 8 can include any of the subject matter of any of the previous examples, wherein the controller can control at least one of the fixed thrust generator and the second thrust generator to apply a yaw moment to the hull via differentiating rotational speed or thrust of the first thrust generator and the second thrust generator.

Example 9 can include any of the subject matter of any of the previous examples, wherein the power source includes at least one of a battery. Power sources that can be used can include, but are not limited to, a fuel cell, one or more a solar cells, a generator, and one or both of an electric motor and an internal combustion engine.

Example 10 can include any of the subject matter of any of the previous examples, including autopilot circuit coupled to the controller to communicate a difference between a course of the hull and one or more waypoints stored in the autopilot.

Example 11 can include any of the subject matter of any of the previous examples, including a yaw sensor coupled to the pod to communicate a yaw signal. The controller can be a feedback controller to control at least one of the fixed thrust generator and the second thrust generator in association with the yaw signal.

Example 12 can include any of the subject matter of any of the previous examples, wherein station-keeping electronics are coupled to the controller. The controller can be to maintain a pitch of the hull in association with a station location signal from the station-keeping electronics.

Example 13 includes subject matter such as a device, apparatus, or network interface device for pitch estimation) comprising n apparatus for attachment to a hull of an aerostat. A pod can be detachably coupled to the hull. A first thrust generator can be fixed to the pod and located a fixed distance left of a center of the hull and aligned to pitch the hull up. A second thrust generator fixed to the pod and located the fixed distance right of the center of the hull and aligned to pitch the hull up. A thrust of the first thrust generator can be substantially aligned with and/or parallel with a thrust of the second thrust generator. A power source can be mounted to the pod and slideable fore and aft. The power source can be coupled to each of the first thrust generator and the second thrust generator to power each of the first thrust generator and the second thrust generator. A power source actuator can be coupled between the pod and the power source to translate the location of the power source with respect to the pod. A sensor can be coupled to the pod to detect a pitch of the hull and provide a pitch signal. A controller can be coupled to one or more of the power source, the power source actuator, the first and second thrust generators and the sensor. The controller can maintain a pitch of the hull by translating the power source within the pod in association with the pitch signal.

Example 14 can include any of the subject matter of any of the previous examples, wherein the controller can control at least one of the fixed thrust generator and the second thrust generator to apply a pitch moment to the hull The location of the power source can be translated to apply a counter-pitch moment to the hull opposite the moment.

Example 15 can include any of the subject matter of any of the previous examples, wherein the controller can be a feedback controller to alter the location of the power source in association with the pitch signal.

Example 16 can include any of the subject matter of any of the previous examples, including a power source position actuator coupled to the power source to receive power from the power source to translate the location of the power source with respect to the pod.

Example 17 can include any of the subject matter of any of the previous examples, including an autopilot coupled to the pod to adjust a rotational speed of at least one of the first thrust generator and the second thrust generator. The autopilot can translate the location of the power source with respect to the pod to keep a station of the aerostat.

Example 18 can include any of the subject matter of any of the previous examples, wherein the pod includes a parachute sized to suspend the pod.

Example 19 includes subject matter (such as a device, apparatus, or network interface device for controlling motion of an aerostat) comprising a method. The method can include coupling a pod to a disposable hull. The method can include sensing a pitch of the hull and providing a pitch signal. Sensing can be in association with the pitch signal. The method can include controlling a pitch of the hull with a first thrust generator fixed to the pod and located a fixed distance left of a center of the hull and aligned to pitch the hull up. Controlling can be in association with the pitch signal. The method can include controlling a pitch of the hull with a second thrust generator fixed to the pod and located the fixed distance right of the center of the hull and aligned to pitch the hull up. A thrust of the first thrust generator can be substantially parallel with a thrust of the second thrust generator. Controlling can be in association with the pitch signal. The method can include controlling a power source actuator coupled between the pod and the power source to translate the location of a power source. The actuator can be mounted to the pod and slideable, such as fore and aft. The method can include powering one or more of the first thrust generator, the second thrust generator, and the power source actuator with the power source, among any other pod electronics.

Example 20 can include any of the subject matter of any of the previous examples, including partially filling the hull with a gas of a lower density than an ambient. The hull can fill with increasing altitude to assume a desired shape.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in that may be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, tier example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system comprising:
a hull that is buoyant, having an inner surface and an outer surface, the hull configured to contain a gas of a lower density than an ambient gas, and the hull includes a main body and a fixed airfoil; and
a pod detachably coupled to the hull, the pod comprising:
a first thrust generator fixed to the pod and located a fixed distance left of a center of the hull and aligned to pitch the hull up;
a second thrust generator fixed to the pod and located the fixed distance right of the center of the hull and aligned to pitch the hull up, wherein a thrust of the first thrust generator is substantially parallel with a thrust of the second thrust generator;
a power source mounted to the pod and slideable fore and aft, the power source coupled to each of the first thrust generator and the second thrust generator to power each of the first thrust generator and the second thrust generator;
a power source actuator coupled between the pod and the power source to translate the location of the power source with respect to the pod;
a sensor coupled to the pod to detect a pitch of the hull and provide a pitch signal; and
a controller coupled to the power source, the power source actuator, the first and second thrust generators, and the sensor, the controller to maintain a pitch of the hull by translating the power source within the pod in association with the pitch signal.

2. The system of claim 1, wherein the controller is configured to control at least one of the first fixed thrust generator and the second thrust generator to apply a pitch moment to the hull, and to translate the power source to apply a counter-pitch moment to the hull opposite the moment.

3. The system of claim 2, wherein the controller is a feedback controller configured to control the power source actuator to alter the location of the power source in association with the pitch signal.

4. The system of claim 1, wherein the hull forms a portion of an aerostat.

5. The system of claim 1, wherein the hull is formed of a film that has a fixed shape when the hull is inflated.

6. The system of claim 5, wherein the hull forms a passive airfoil.

7. The system of claim 6, wherein the hull includes tail fins fixed in place.

8. The system of claim 1, wherein the controller is configured to control at least one of the first fixed thrust generator and the second thrust generator to apply a yaw moment to the hull via differentiating thrust of the first thrust generator and the second thrust generator.

9. The system of claim 1, wherein the power source includes at least one of a battery, a fuel cell, a solar cell, a generator, a motor and an engine.

10. The system of claim 1, comprising an autopilot circuit coupled to the controller to communicate a difference between a course of the hull and one or more waypoints stored in the autopilot circuit.

11. The system of claim 10, comprising a yaw sensor coupled to the pod to communicate a yaw signal, wherein the controller is a feedback controller to control at least one of the first fixed thrust generator and the second thrust generator in association with the yaw signal.

12. The system of claim 1, comprising station-keeping electronic circuitry coupled to the controller, wherein the controller is configured to maintain a pitch of the hull in association with a station location signal from the station-keeping electronics.

13. The apparatus of claim 1, comprising a power source position actuator coupled to the power source to receive power from the power source to translate the location of the power source with respect to the pod.

14. The apparatus of claim 1, comprising an autopilot circuit that is coupled to the pod and configured to adjust a rotational speed of the first thrust generator and a rotational speed of the second thrust generator, and the autopilot circuit is configured to translate the location of the power source with respect to the pod to maintain a station of the hull.

15. The apparatus of claim 1, wherein the pod includes a parachute sired to suspend the pod.

16. A method, comprising:
coupling a pod to a disposable hull having a main body and a fixed airfoil;
sensing a pitch of the hull and providing a pitch signal;
in association with the pitch signal, controlling a pitch of the hull with a first thrust generator fixed to the pod and located a fixed distance left of a center of the hull and aligned to pitch the hull up;
in association with the pitch signal, controlling a pitch of the hull with a second thrust generator fixed to the pod and located the fixed distance right of the center of the hull and aligned to pitch the hull up, wherein a thrust of the first thrust generator is substantially parallel with a thrust of the second thrust generator;
in association with the pitch signal, controlling a power source actuator coupled between the pod and a power source to translate the location of the power source, mounted to the pod and slideable fore and aft, with respect to the pod; and
powering the first thrust generator, the second thrust generator, and the power source actuator with the power source.

17. The method of claim 16, comprising:
partially filling the hull with a gas of a lower density than an ambient; and
launching the hull, the hull filling with air, as altitude increases, to assume a desired shape.

18. The method of claim 16, comprising controlling at least one of the first fixed thrust generator and the second thrust generator to apply a pitch moment to the hull, and translating the power source to apply a counter-pitch moment to the hull opposite the moment.

19. The method of claim 18, comprising using a feedback controller, controlling the power source actuator to alter the location of the power source in association with the pitch signal.

* * * * *